United States Patent [19]

Alvarez et al.

[11] Patent Number: 4,919,853

[45] Date of Patent: Apr. 24, 1990

[54] APPARATUS AND METHOD FOR SPRAYING LIQUID MATERIALS

[75] Inventors: Joseph L. Alvarez, Idaho Falls; Lloyd D. Watson, Rigby, both of Id.

[73] Assignee: The United States of America as represented by the United States Department of Energy, Washington, D.C.

[21] Appl. No.: 146,631

[22] Filed: Jan. 21, 1988

[51] Int. Cl.[5] .................... B29B 9/10

[52] U.S. Cl. .................... 264/12; 261/78.2; 261/142; 261/DIG. 78; 425/7

[58] Field of Search .................... 264/12, 13, 14; 425/6, 425/7; 261/78.2, 142, DIG. 78

[56] References Cited

U.S. PATENT DOCUMENTS

| | | | |
|---|---|---|---|
| 1,592,982 | 7/1926 | Loepsinger | 261/78.2 |
| 2,101,922 | 12/1937 | Stoesling | 261/142 |
| 2,565,691 | 8/1951 | Ketelsen | 261/78.2 |
| 2,887,181 | 5/1959 | Dillon | 261/78.2 |
| 2,929,436 | 3/1960 | Hampshire | 118/303 |
| 2,997,245 | 8/1961 | Nilsson et al. | 241/1 |
| 3,067,956 | 12/1962 | Tove | 241/1 |
| 3,524,630 | 8/1970 | Marion | 261/78.2 |
| 3,605,949 | 9/1971 | Vock | 261/78.2 |
| 3,817,233 | 6/1974 | Kihn | 261/142 |
| 3,826,301 | 7/1974 | Brooks | 164/46 |
| 3,909,921 | 10/1975 | Brooks | 164/46 |
| 3,931,814 | 1/1976 | Rivere | 261/DIG. 78 |
| 4,267,131 | 5/1981 | Prudhon et al. | 261/78.2 |
| 4,483,805 | 11/1984 | Glindsjo | 261/78.2 |
| 4,485,834 | 12/1984 | Grant | 264/12 |

OTHER PUBLICATIONS

"The Dynamics and Thermodynamics of Compressible Fluid Flow", Ascher H. Shapiro, vol. 1, pp. 84–87 (1953).

*Primary Examiner*—Jan H. Silbaugh
*Assistant Examiner*—Mary Lynn Fertig
*Attorney, Agent, or Firm*—Hugh G. Glenn; Robert J. Fisher; William R. Moser

[57] ABSTRACT

A method for spraying liquids involving a flow of gas which shears the liquid. A flow of gas is introduced in a converging-diverging nozzle where it meets and shears the liquid into small particles which are of a size and uniformity which can be controlled through adjustment of pressures and gas velocity.

6 Claims, 1 Drawing Sheet

APPARATUS AND METHOD FOR SPRAYING LIQUID MATERIALS

CONTRACTUAL ORIGIN OF THE INVENTION

The United States has rights in this invention pursuant to Contract No. DE-AC07-76ID01570 between the United States Department of Energy and Idaho National Engineering Laboratory.

TECHNICAL FIELD

The present invention relates to a method and apparatus for spraying or atomizing liquid materials, and more particularly, a method of atomizing a liquid into a uniform distribution of droplets over a specific cross sectional area.

BACKGROUND OF THE INVENTION

Liquids have been rendered into droplets by a variety of means but most commonly by shearing a liquid stream. The shearing may be introduced by several methods and the particle size distribution of the resulting atomized droplets may be controlled dependent upon several factors based upon the method used. The simplest method to introduce shear is by forcefully ejecting the liquid through a constriction of a desired shape to cause increased perturbations on the liquid stream. Break up devices may be inserted in the path of the stream to introduce secondary shear. Further shear is introduced by drag of the atmopshere through which the stream passes, much as experienced, for instance by a free falling liquid, known as atmospheric drag shear. Shear may also be introduced by vibratory means. Liquid films may be sheared as filaments leave a spinning disc or cup. Additional shear may be introduced by intersecting the liquid stream with a second fluid stream, either gas or liquid. The two most common methods are variations of the first and last methods.

Applications of these techniques range from spraying water, to paints, to applying insecticides, to medicines, and include forming metal powders for special metallurgical applications. Many applications do not warrant attempts at improvement since energy requirements and complications detract from the present simplicity of the process with no additional advantages. Many processes can be improved, however, where a uniform droplet size distribution is required in a specific size range. As may be expected, the smaller the size, the more difficult this is to achieve. Many processes can be improved or simplified where droplet production is required in harsh environments or in the use of hazardous materials. Particular efforts have been made in improving gas to liquid coupling in two diverse fluid systems by configurational modifications of the spraying apparatus and by increasing the energy of the gas. In addition, the particle size distribution may be controlled by sonic and ultrasonic vibrations imposed upon the gas stream; some of these aproaches are described in U.S. Pat. Nos. 2,997,245, 3,067,956, 3,829,301, and 3,909,921. In general, particle size distribution directly relatable to gas velocities or vibrational frequencies has not been demonstrated, since particle size distribution for these designs of the prior art related directly to total gas flow only. The sonic velocities of a two-phase flow when a gas stream couples with a liquid stream were not considered. While very small particle sizes have been possible in the prior art, the sizes obtained were more related to the increased gas pressure than the imposed frequency of a second stream.

DISCLOSURE OF THE INVENTION

The present invention is a system for spraying or nebulizing liquids by shearing with a supersonic two phase jet such that the particle size distribution is controlled within a narrow specified range; the resulting spray is relatively uniform in cross-section and directed with minimal expansion of the spray cross-section. The system in inherently controllable: the liquid to gas mass ratio and the two phase mixture are adjusted to obtain a certain sonic velocity whereby a sonic shock wave or waves and an imposed sonic frequency are maintained in the nozzle. Such adjustments ensure that coupling between the gas energy occurs in the form of shock waves, sonic frequencies, and velocity and liquid to be sheared such that optimum energy is delivered to the liquid and subsequent liquid droplets. The imposed frequency is selective for a single particle size, tending to disintegrate droplets larger than the desired size and to agglomerate those smaller, thereby forming a spary of substantially uniform particle size.

DETAILED DESCRIPTION OF THE INVENTION

Figure 1:
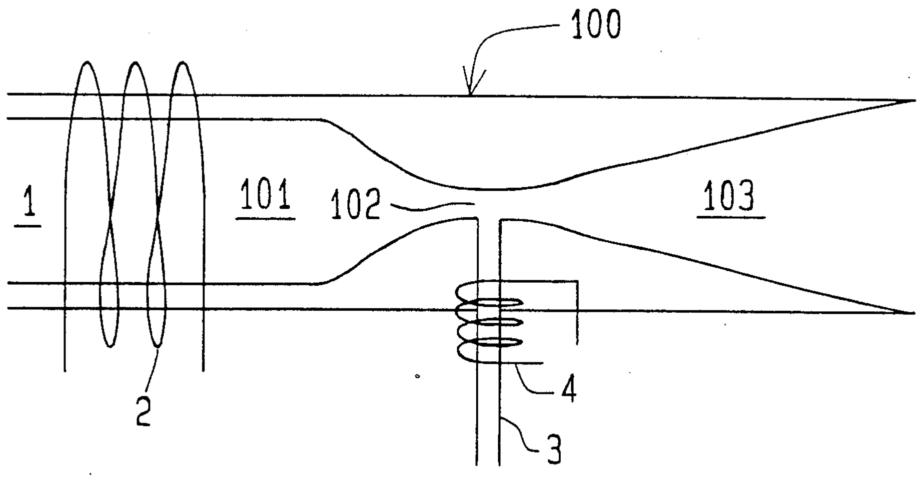
FIG. 1 is a schematic of a nozzle of the subject invention with the liquid feed near the choke point.
Figure 2:
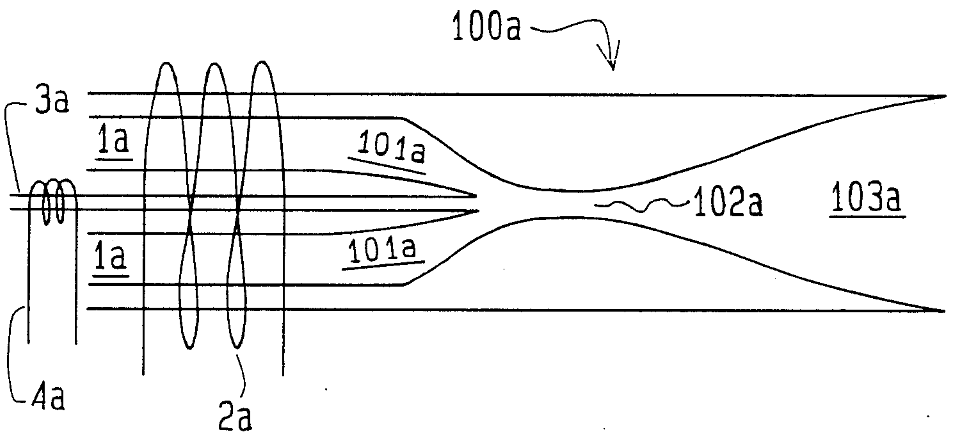
FIG. 2 is a schematic of a nozzle showing a second embodiment of the subject invention with the liquid feed located in-line.

FIGS. 1 and 2 represent different embodiments of the sonic nebulizing units of the subject invention and are similar with the exception of the position of the liquid inlets 3 and 3*a*. The different embodiments may be referred to as "in-line," FIG. 2, and "orthogonal," FIG. 1, nebulizers. The figures show a cross-section schematic of the nozzles which may either be cylindrical or rectangular, the dimension extending perpendicularly into or out of the page having no predetermined limit.

FIG. 1 shows a gas inlet portion 101 of a nozzle which converges to a minimum at the choke point 102 and then diverges outwardly in the exit portion 103 of the nozzle. Suitable gases which may be used in the subject invention are those gases which are compatible with the material to be sprayed, as well as with the materials of the spraying apparatus. Such gases are generally the inert gases, such as Argon, Nitrogen, Helium, Neon, and the like. Other gases, such as air, may be functional in limited applications.

In FIG. 1, the nebulizing gas is introduced to the units through the gas feed 1. The gas feed 1 may be temperature controlled by elements 2. The gas feed terminates at the converging portion where the choke point 102 of the converging-diverging nozzle 100 exists. The liquid feed 3 may also be temperature controlled by elements 4 and is located orthogonally near or about the narrow or choke point 102 of the nozzle 100. In other words, the liquid feed 3 is positioned for entry perpendicular to the flow of gas from gas feed 101. The exact location of liquid feed 3 may vary dependent primarily on the proportion or species of the components involved and may also depend on the sonic velocity of the two-phase mixture and the amount of aspiration at the liquid outlet desired, and thus the location of the liquid feed 3 may be adjusted relative to the choke point. Such relative placement will affect spray shape and dimensions, liquid throw, spray placement, and other spray parameters. Though the liquid feed 3 in FIG. 1 is shown to enter from one side, it may enter from either side or both sides simultaneously. The liquid feed may be a single or multiple pointentrance or a continuous slit. The diverging section of the nozzle 103 can have a length, shape and degree of divergence dependent upon the sonic velocities of the two-phase mixture, the desired characteristics of the exiting stream and droplet size distribution, as discussed below.

Liquids which may be sprayed by the apparatus and method of the subject invention include those liquids which are compatible with the materials of the apparatus. Even liquids of very high viscosity may be sprayed. Molten metals, such as Tin, Aluminum, Copper, and Steel, may be sprayed.

FIG. 2 depicts another embodiment of the subject invention utilizing an in-line liquid feed 3*a*. The gas feed 1*a* may be temperature controlled by elements 2*a* as in FIG. 1. The in-line feed 3*a* terminates at the converging portion 101*a* of nozzle 100*a*. The two-phase mixture is mixed at or about the choke point 102*a* and exits the nozzle via diverging portion 103*a*. As in FIG. 1, the liquid feed may be a single or multiple point entrance, or it may be a continuous slit. Temperature may be controlled by element 4*a*.

Figure 3:
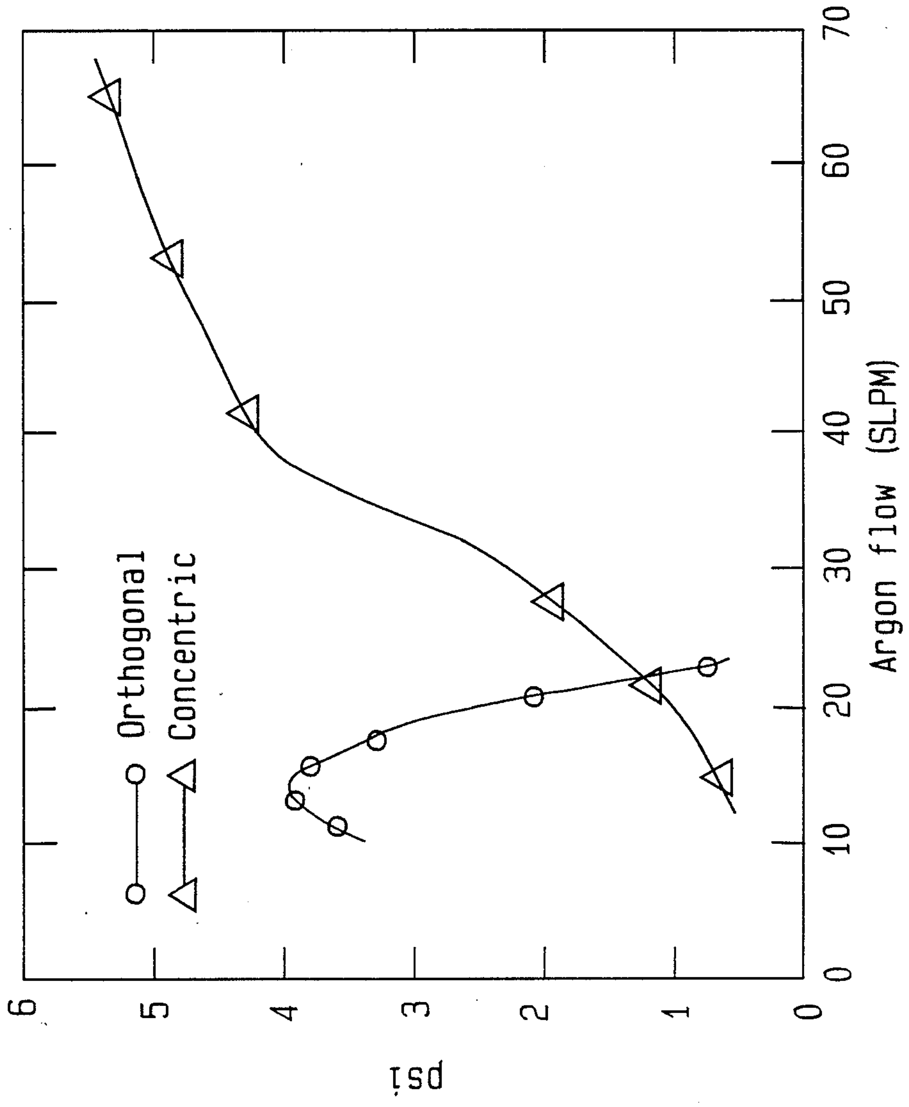
FIG. 3 is a graph showing the static head produced by a gas flow withhout a liquid in the liquid feed of FIG. 1 compared to that of the apparatus of a conventional (concentric) system.
Figure 4:
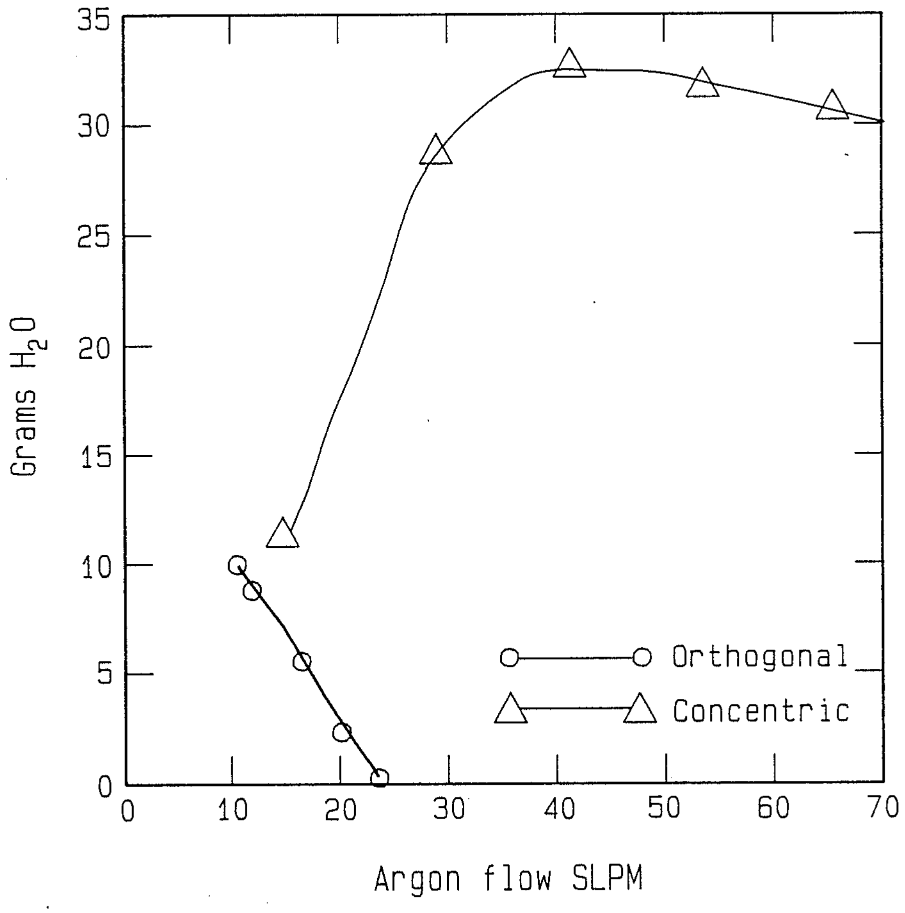
FIG. 4 is a graph showing the amount of water aspirated as related to gas flow in the apparatus of FIG. 1 as compared to a convention (concentric) system.
Figure 5:
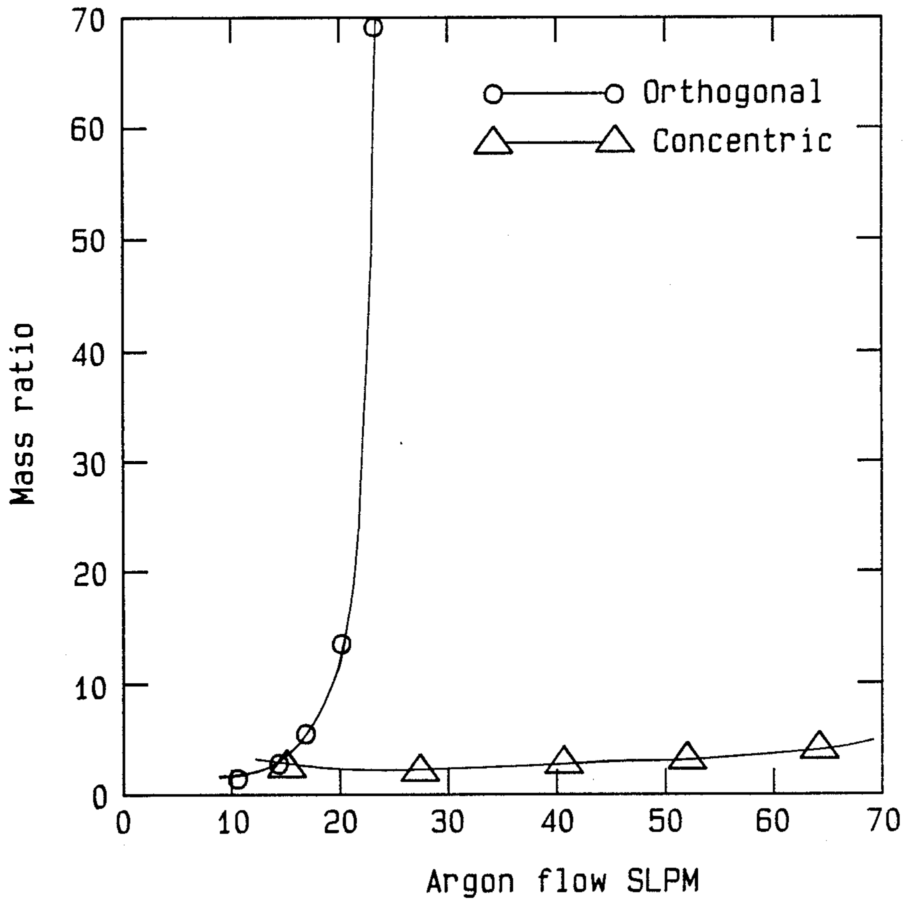
FIG. 5 is a graph showing the mass ratios of gas to aspirated liquid for a nozzle according to FIG. 1 and compared to a conventional (concentric) system.
Figure 1:
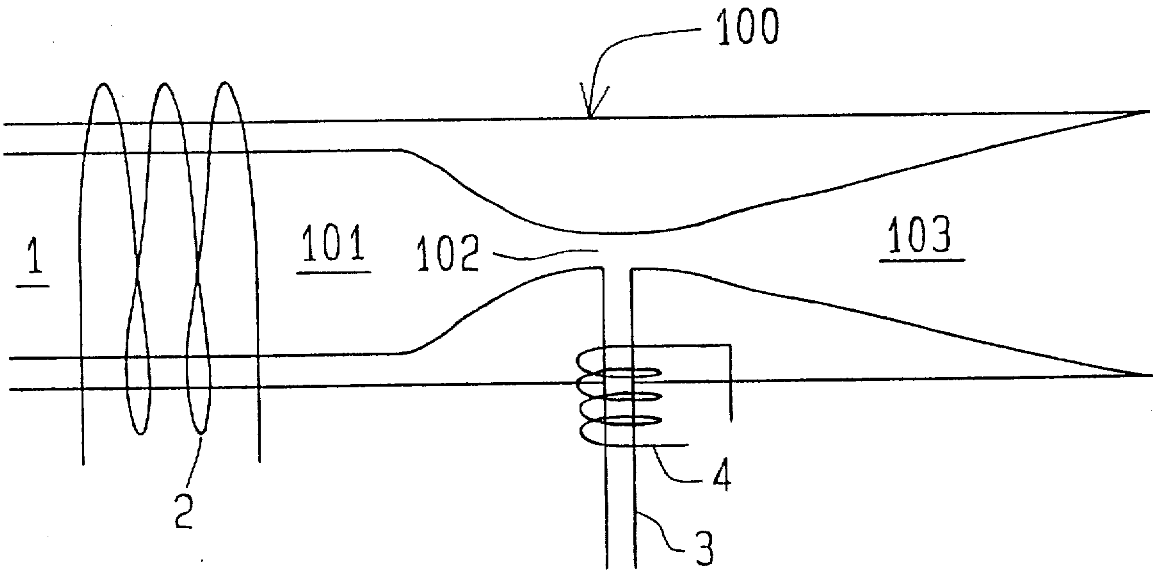
Figure 2:
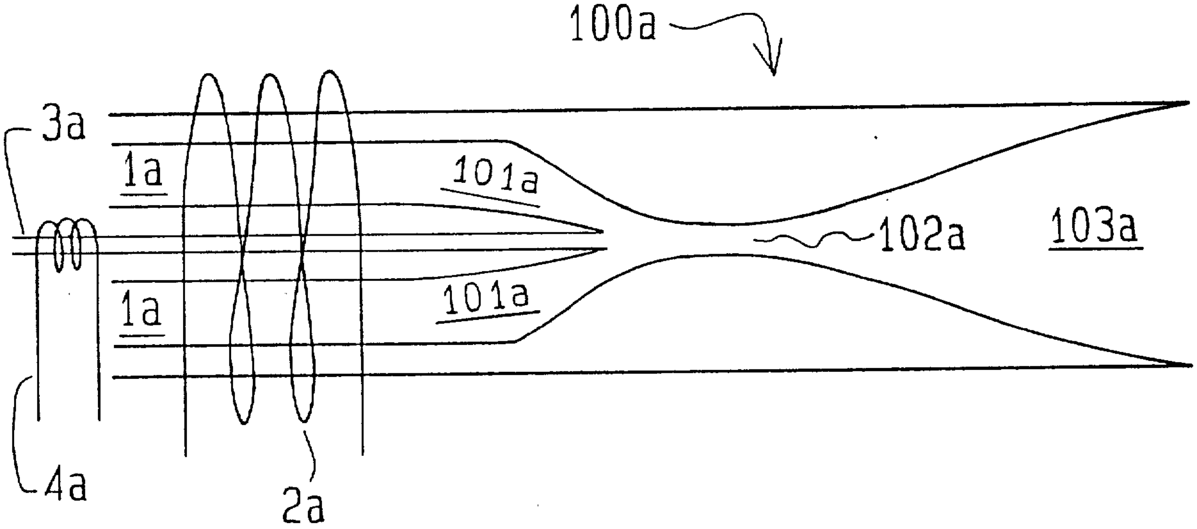
Figure 3:
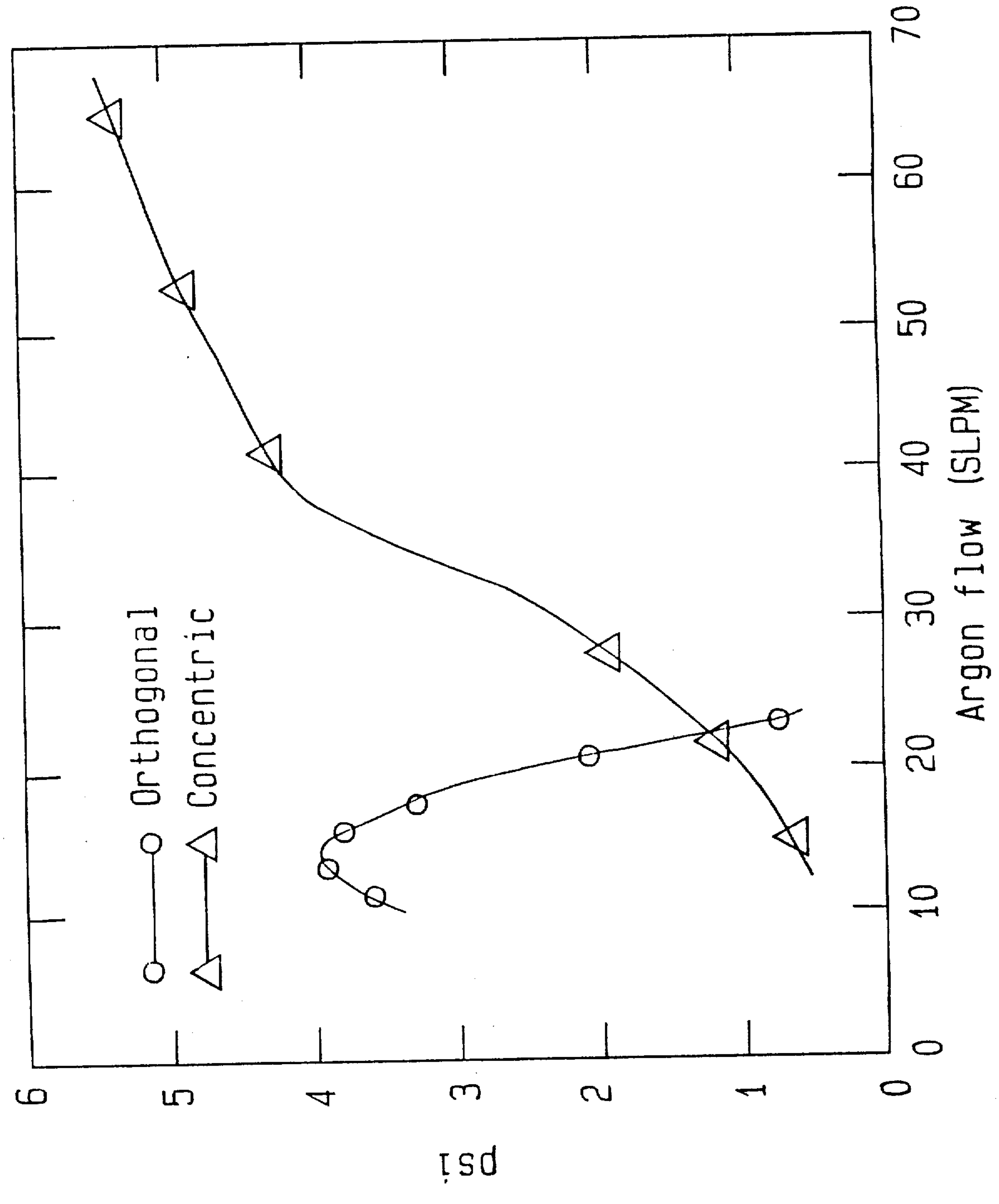
Figure 4:
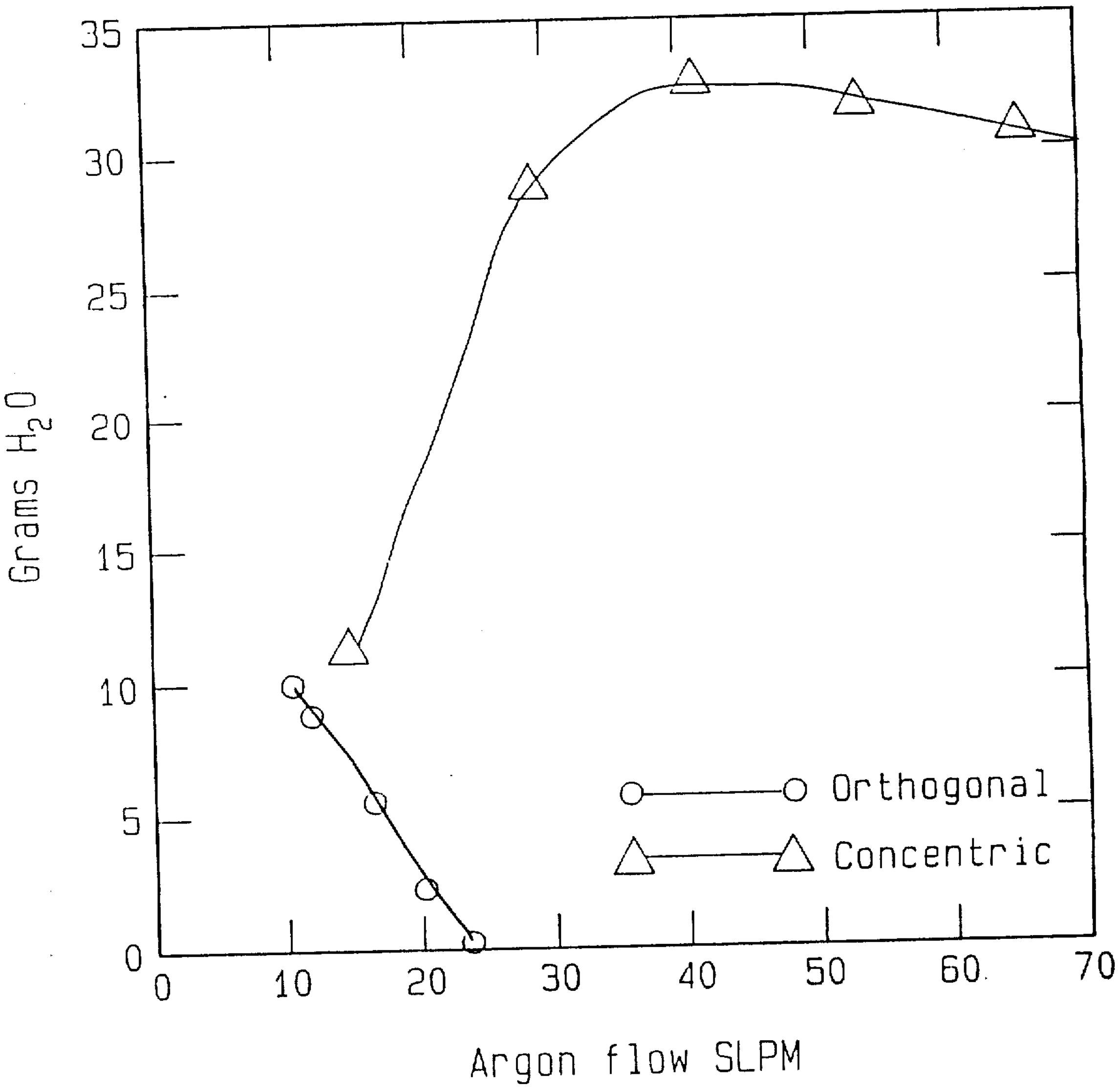
Figure 5:
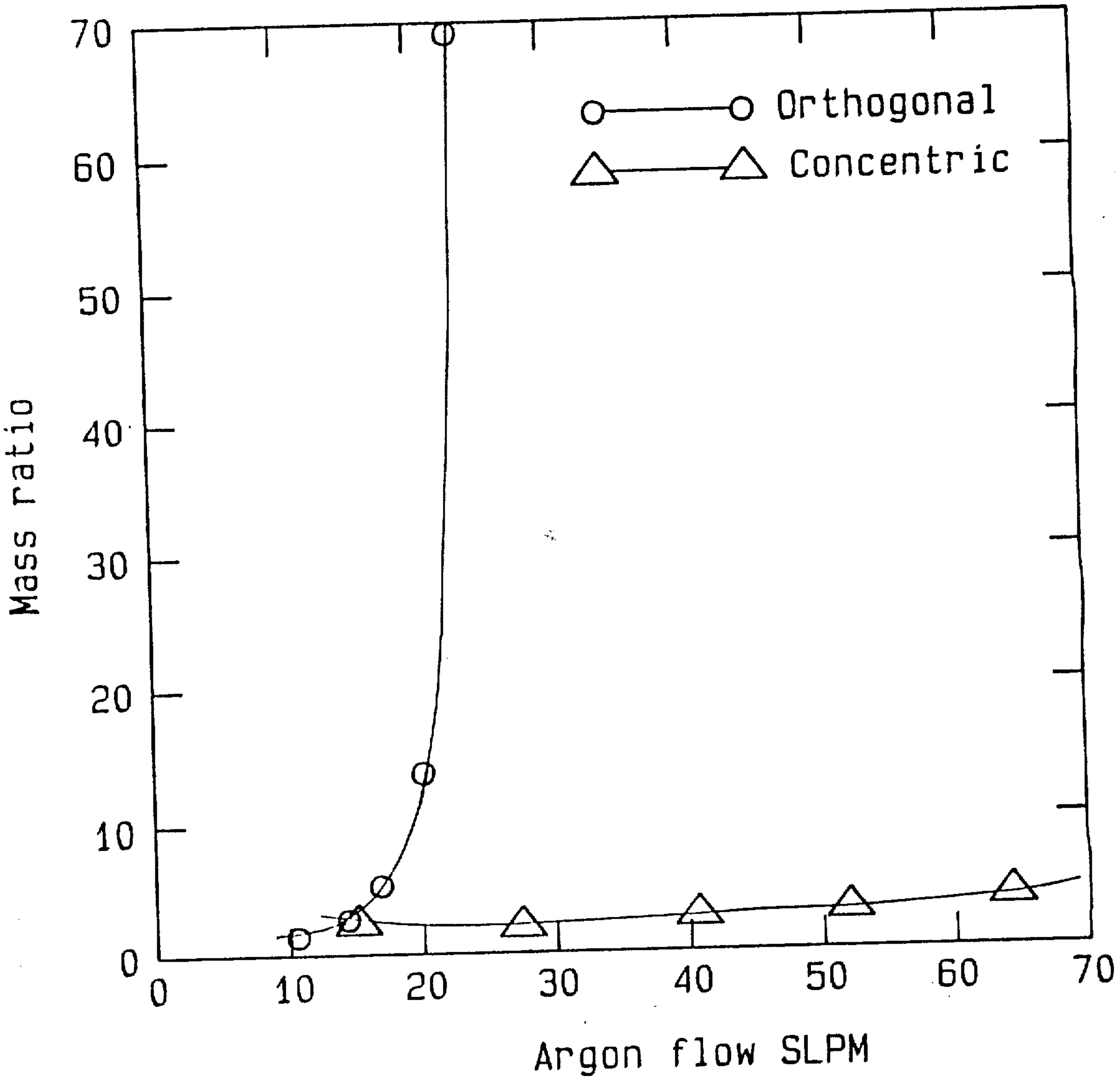

In general, an atomizing or nebulizing apparatus produces a stream of liquid droplets by shear when a gas and liquid stream interact under the conditions produced in the apparatus. The apparatus of the subject invention provides very efficient coupling between the gas and liquid and allows maximum control of the process because the coupling occurs under certain controllable conditions in the choke point of the nozzle. Experimental evidence of the narrow region of effectiveness are shown in FIGS. 3–5. The nozzle of the subjection invention is compared to a more conventional nebulizer that also aspirates the liquid but is not mounted in a converging-diverging nozzle.

In the apparatus and method of the subject invention, the liquid and gas are fed into the nozzle such that the two phases (gas and liquid) mix at or around the gas choke point and enter the diverging section of the nozzle where the two phase mixture expands and utilizes some of the energy of expansion to push the two phase mixture into supersonic speed.

FIG. 3 shows the static head produced at the choke point of the nozzle when gas is directed through the gas feed without a liquid in the liquid feed. The nozzle of the subject invention produces aspiration only over a narrow gas flow range measured in standard liters per minute (SLPM) with a definite maximum in the suction produced, while the conventional system tends to increase with flow rate.

FIG. 4 shows the amount of water aspirated when water is introduced to the liquid feed with the same gas flow conditions (measured in standard liters per minute SLPM). The amount of water aspirated descreases monotonically over the operating region of the nozzle of the subject invention. The conventional system increases the water aspirated to a maximum which is dependent upon the vapor pressure and temperature of the water; at that point, the water vaporizes and reduces the vacuum.

FIG. 5 shows the gas to liquid mass ratios of the two systems. The ratio is essentially the same for a large range of gas flow rates in the conventional system, but changes appreciably in the nozzle of the subject invention. Gas flow is measured in standard liters per minute (SLPM).

The three figures also indicate how the system of the subject invention can be controlled. First, with given nozzle dimensions, as shown by FIGS. 3–5, aspiration will occur only within a very narrow range of gas velocities. However, such parameters can be altered by changing the dimensions of the liquid feed or changing the delivery pressure of the liquid. Increasing either or both will decrease the gas to liquid ratio, which will increase the average droplet size and decrease the cooling, but will increase the liquid delivery rate. Decreasing either or both will have the inverse effect. Increasing the ambient pressure of the nozzle exit will require an increase in the pressure of the nebulizing gas to ensurean increase in the gas to liquid ratio and a decrease in the droplet size with an increase in cooling, but without an increase in the liquid flow rate.

The parameters discussed above are those conditions where the pressure at the nozzle exit matches the ambient pressure. The structural dimensions of the nozzle may be established by first determining A/A* from the one-dimensional steady flow calculation $$\frac{A}{A^*} = \left[\frac{1}{M}\quad\frac{2}{\gamma+1} + \frac{\gamma-1}{\gamma+1}M^2\right]^{(\gamma+1)/(2(\gamma-1))}$$

where M is the Mach number or ratio of the speed of the gas flow to the speed of sound, A is the area at some position downstream of the nozzle throat, A* is the area of the nozzle throat and $\gamma$ is the ratio of the specific heats of the two phase mixture. A/A* at a given downstream position will vary dependent upon the two phase mixture in use and the speed contemplated. The length and shape of the nozzle is then determined by an iterative procedure known in the field of nozzle design as hodograph construction which is a means for determining the dimensions of a nozzle for supersonic flow by a graphical, calculational method which minimizes the shocks encountered by a supersonic flow through a given nozzle; however, it it possible to modify an existing nozzle based on the above formula and the value gained for A/A*. Either method requires an estimate or empirical determination of $\gamma$ for the two phase mixture, as known in the art.

An important aspect of the supersonic nozzle of the subject invention is the ability to control the shape of the exiting spray. When the exit pressure equals the ambient pressure, the spray maintains the same cross section as the nozzle exit. When the exit pressure is lower, the spray converges and when the exit pressure is higher the spray diverges. The shape of the exiting spray can therefore be predetermined.

By the method of the subject invention, supersonic conditions as well as shock or nebulizing conditions are established by breaking up a liquid through shear into fine droplets by a nebulizing gas to form a two-phase flow. In the method of the subject invention, the placement of the liquid feed may be varied to control aspiration of the liquid for inducing and controlling liquid flow and to control the shearing by the nebulizing gas. The ability to shape the exiting plume and affect the distribution of the droplets in that plume and to control the temperature of that plume are further advantages of the subject method.

A preferred embodiment of this invention is a supersonic spray nozzle that is a converging-diverging nozzle which is either circular or linear at its exit and such that supersonic conditions for a two-phase mixture are established within the nozzle. The mass of droplets and droplet size will influence this velocity, the shock conditions and the coupling of the shock and the two phases. Conversely, the shock conditions and coupling of the shock and the two phases will influence the droplet size and droplet distribution within the nozzle. The mixture will choke and hence shock at a velocity well below the choking velocity of the gas, allowing coupling to and disintegration of the liquid at gas delivery pressures below those of previous nozzle designs.

The frequency of shocks can be increased such that an ultra-sonic frequency is imposed for selecting a narrow droplet size distribution. The droplet size distribution can be narrowed and made more uniform by disintegrating the larger droplets and agglomerating the smaller droplets of the distribution. The periodic shocks can be established by shape, length, and pressure of the nozzle, by periodic roughness of the surfaces of the nozzle, such as, machining marks, or by imposing a frequency on the gas prior to the choke point.

The position of the end of the liquid feed 3 and 3*a* of FIGS. 1 and 2 will also affect the spray characteristics. The liquid feed 3 and 3*a* can be so positioned to the rear or the front within the choke point 102 or 102*a*, thereby increasing or decreasing the amount of aspiration or back pressure of the liquid feed, which will determine the flow rate of the liquid when considered in combination with the liquid pressure. The liquid flow can thus be controlled by varying liquid pressure, nozzle exit pressure, gas flow and gas pressure. This will allow control of the spray pattern, plume density and droplet size distribution during the process as conditions or requirements vary, and can be utilized in conjunction with adjustment of the position of the liquid inlet relative to the choke point to further control the spray.

Another manner of controlling the spray is to control the temperature of either or both the liquid and gas feeds. This control may be necessary to prevent freezing of the liquid in the liquid feed or freezing witin the nozzle before all necessary conditions are established. A further consideration in temperature control is that sonic conditions are temperature dependent and dependent upon the degree of thermal equilibrium between the phases. A further need for the temperature control is to vary the droplet temperature at the exit, to compensate for heating or cooling from phase interactions, and to compensate for cooling from expansion of the two phase mixture.

EXAMPLE

A cylindrical nozzle having an orthogonal single point liquid feed was designed for spraying liquid tin. The nozzle had an entrance cone of 38° and an exit cone of 17°. The exit cone was terminated at an exit diameter which is a multiple of 10 times the constriction diameter. An argon flow of 16 standard liters per minute (SLPM) was established at the choke point, thereby effecting a 3.9 psi static head across the liquid feed with no liquid being fed. Distilled water was then aspirated through the liquid feed of the nozzle while the nozzle exit pressure was maintained equal to ambient pressure. A water flow of 6 grams/min. was achieved, and the mass ratio of argon to water was 4.0. A uniform cross-section of the resultant spray was observed as well as a uniform particle size distribution of the spray.

With the subject invention, any liquid chemically compatible with the materials of the spray apparatus should be able to be sprayed. Even liquids of very high viscosity are capable of being sprayed. The sonic perturbations of the two phase mixture apparently are responsible for such high capabilities, and shears the liquid into discrete particles of a size which might form a spray. Thus, practically any liquid may be sprayed, including molten metals such as steel or tin. Similarly, any gas which is compatible with the materials of the spray apparatus and the liquid being sprayed should be capable of being sprayed.

In addition, it may be possible to feed two different liquids from two separate liquid feeds. In such cases, adjustments to the respective relative feed rates will be called for to compensate for the differences in viscosity, vapor pressure, surface tension and the like of the respective liquids. In addition, while such an arrangement might result in a homogeneous spray, the particular sizing of the individual liquids might vary within the spray. Differences in placement of the respective feeds might also affect the size and shape of the spray.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, itis intended that the invention not be limited to the particular embodiment disclosed as the best mode contemplated for carrying out this invention, but that the invention will include all embodiments and equivalents falling within the scope of the appended claims.

Various features of the invention are set forth in the following claims.

We claim:

1. An apparatus for spraying liquids comprising:

a nozzle of certain dimensions having a converging gas inlet portion;

a choke portion;

a divergent spray outlet poriton, said choke portion being intermediate and connecting said converging gas inlet portion with said divergent spray outlet portion, said nozzle being formed by an iterative procedure in successive steps to change the nozzle dimensions and thereby form a desired spray pattern and particle size beginning with the equation $$\frac{A}{A^*} = \frac{1}{M}\left[\frac{2}{\gamma + 1} + \frac{\gamma - 1}{\gamma + 1}M^2\right]^{(\gamma + 1)/(2(\gamma - 1))}$$

wherein the area A is the area of the nozzle measured at a selected distance downstream the area A* is the area of the nozzle throat, M is the ratio of the speed of the gas flow to speed of sound, and $\gamma$ is a function of the specific heats of the two-phase gas mixture; and a liquid inlet means, said liquid inlet means terminating in the region of said choke portion to permit the feeding of a liquid into the region of the choke point for mixing with a gas from said gas inlet to form a two-phase mixture.

2. The apparatus of claim 1 further including an element for controlling temperature of said gas inlet portion.

3. The apparatus of claim 1 further including an element for controlling temperature of said liquid inlet means.

4. The apparatus of claim 1 wherein said nozzle and said liquid inlet means are rectangular in cross-section.

5. The apparatus of claim 1 wherein said nozzle and said liquid inlet means are circular in cross-section.

6. A method for nebulizing liquids comprising the steps of:

forming a nozzle having interconnected converging, restrictive, and diverging portions through an iterative procedure beginning with the equation, $$\frac{\frac{A}{A^*} = \frac{1}{M}\left[\frac{2}{\gamma+1} + \frac{\gamma-1}{\gamma+1}M^2\right]^{(\gamma+1)/(2(\gamma-1))}}{\left[\frac{A}{A^*} = \left[\frac{1}{M}\,\frac{2}{\gamma+1} + \frac{\gamma-1}{\gamma+1}M^2\right]^{(\gamma-1)/(2(\gamma-1))}\right]}$$

where A* is the area of the nozzle throat and A is the area of the nozzle at a selected distance downstream; M=ratio of the speed of the gas flow to the speed of sound, and is the ratio of the specific heats of the two-phase gas mixture;

modifying the nozzle dimensions using the equation to achieve a nozzle having a desired spray pattern and particle size;

forcing a gas through said nozzle at initially a subsonic speed;

delivering a liquid at subsonic speed for contact and mixing with said gas in said restrictive portion of said nozzle at subsonic speed; and maintaining the pressure at the exit of said diverging portion of said nozzle equal to ambient pressure whereby the resultant two-phase mixture exits with substantially uniform particle size and a substantially non-dispersed spray pattern.

* * * * *

UNITED STATES PATENT AND TRADEMARK OFFICE
CERTIFICATE OF CORRECTION

PATENT NO. : 4,919,853

DATED : April 24, 1990

INVENTOR(S) : Joseph L. Alvarez, et al

It is certified that error appears in the above-identified patent and that said Letters Patent is hereby corrected as shown below:

The title page showing the illustrative figure should be deleted to appear as per attached title page.

<u>In the Drawing:</u>

Sheets 1, 2, 3 and 4 including Figures 1, 2, 3, 4 and 5 are hereby incorporated into the above-identified United States Patent.

Signed and Sealed this

Twenty-seventh Day of August, 1991

*Attest:*

HARRY F. MANBECK, JR.

*Attesting Officer*

*Commissioner of Patents and Trademarks*

United States Patent [19]
Alvarez et al.

[11] Patent Number: 4,919,853
[45] Date of Patent: Apr. 24, 1990

[54] APPARATUS AND METHOD FOR SPRAYING LIQUID MATERIALS

[75] Inventors: Joseph L. Alvarez, Idaho Falls; Lloyd D. Watson, Rigby, both of Id.

[73] Assignee: The United States of America as represented by the United States Department of Energy, Washington, D.C.

[21] Appl. No.: 146,631

[22] Filed: Jan. 21, 1988

[51] Int. Cl.[5] ..... B29B 9/10
[52] U.S. Cl. ..... 264/12; 261/78.2; 261/142; 261/DIG. 78; 425/7
[58] Field of Search ..... 264/12, 13, 14; 425/6, 425/7; 261/78.2, 142, DIG. 78

[56] References Cited

U.S. PATENT DOCUMENTS

| | | | |
|---|---|---|---|
| 1,592,982 | 7/1926 | Loepsinger | 261/78.2 |
| 2,101,922 | 12/1937 | Stoesling | 261/142 |
| 2,565,691 | 8/1951 | Ketelsen | 261/78.2 |
| 2,887,181 | 5/1959 | Dillon | 261/78.2 |
| 2,929,436 | 3/1960 | Hampshire | 118/303 |
| 2,997,245 | 8/1961 | Nilsson et al. | 241/1 |
| 3,067,956 | 12/1962 | Tove | 241/1 |
| 3,524,630 | 8/1970 | Marion | 261/78.2 |
| 3,605,949 | 9/1971 | Vock | 261/78.2 |
| 3,817,233 | 6/1974 | Kihn | 261/142 |
| 3,826,301 | 7/1974 | Brooks | 164/46 |
| 3,909,921 | 10/1975 | Brooks | 164/46 |
| 3,931,814 | 1/1976 | Rivere | 261/DIG. 78 |
| 4,267,131 | 5/1981 | Prudhon et al. | 261/78.2 |
| 4,483,805 | 11/1984 | Glindsjo | 261/78.2 |
| 4,485,834 | 12/1984 | Grant | 264/12 |

OTHER PUBLICATIONS

"The Dynamics and Thermodynamics of Compressible Fluid Flow", Ascher H. Shapiro, vol. 1, pp. 84–87 (1953).

*Primary Examiner*—Jan H. Silbaugh
*Assistant Examiner*—Mary Lynn Fertig
*Attorney, Agent, or Firm*—Hugh G. Glenn; Robert J. Fisher; William R. Moser

[57] ABSTRACT

A method for spraying liquids involving a flow of gas which shears the liquid. A flow of gas is introduced in a converging-diverging nozzle where it meets and shears the liquid into small particles which are of a size and uniformity which can be controlled through adjustment of pressures and gas velocity.

6 Claims, 4 Drawing Sheets

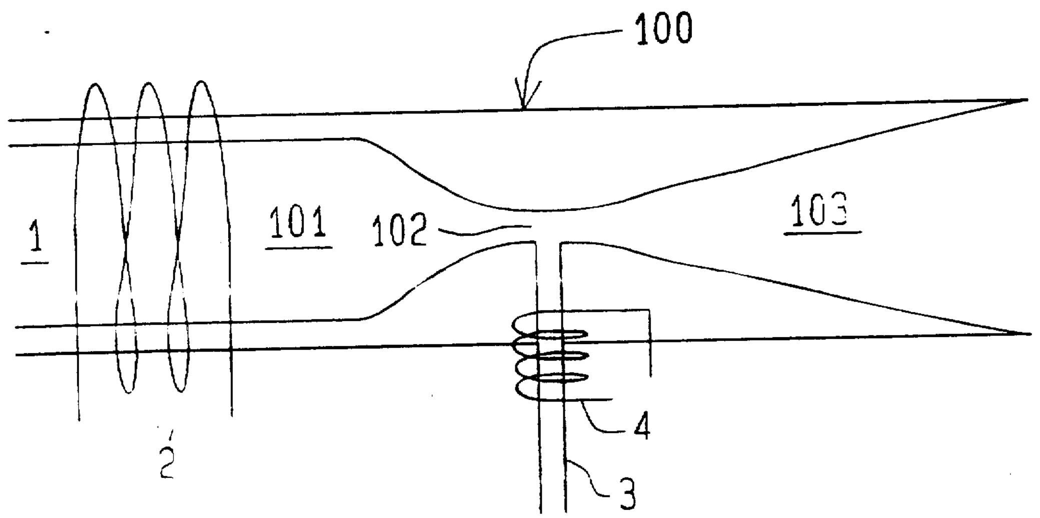

UNITED STATES PATENT AND TRADEMARK OFFICE
CERTIFICATE OF CORRECTION

PATENT NO. : 4,919,853

DATED : April 24, 1990

INVENTOR(S) : Joseph L. Alvarez, et al

It is certified that error appears in the above-identified patent and that said Letters Patent is hereby corrected as shown below:

Column 4, lines 35 - 40, change the equation shown there to read as follows:

$$\frac{A}{A^*} = \frac{1}{M}\left[\frac{2}{\gamma+1} + \frac{\gamma-1}{\gamma+1}M^2\right]^{(\gamma+1)/(2(\gamma-1))}$$

IN THE CLAIMS:

Claim 6, Column 8, lines 1 - 7, change the equation shown there to read as follows:

$$\frac{A}{A^*} = \frac{1}{M}\left[\frac{2}{\gamma+1} + \frac{\gamma-1}{\gamma+1}M^2\right]^{(\gamma+1)/(2(\gamma-1))}$$

Signed and Sealed this

Twenty-second Day of September, 1992

*Attest:*

DOUGLAS B. COMER

*Attesting Officer*

*Acting Commissioner of Patents and Trademarks*